United States Patent [19]
Doi et al.

[11] Patent Number: 5,347,206
[45] Date of Patent: Sep. 13, 1994

[54] VECTOR CONTROL METHOD OF INDUCTION MOTOR

[75] Inventors: Kazuhiko Doi, Cyoful; Koji Yamada, Tokyo; Masayuki Mori, Tsushima, all of Japan

[73] Assignee: Otis Elevator Company, Farmington, Conn.

[21] Appl. No.: 750,422

[22] Filed: Aug. 12, 1991

Related U.S. Application Data

[63] Continuation-in-part of Ser. No. 636,855, Jan. 2, 1991, abandoned.

[30] Foreign Application Priority Data

Jul. 4, 1989 [JP] Japan ................................ 1-172758

[51] Int. Cl.⁵ .............................................. H02P 1/26
[52] U.S. Cl. ...................................... 318/818; 318/798
[58] Field of Search ................................. 318/798–803, 318/805, 807, 809, 767, 766, 811, 812, 818, 825, 826

[56] References Cited

U.S. PATENT DOCUMENTS 4,967,135 10/1990 Ashikaga et al. .................... 318/808

*Primary Examiner*—William M. Shoop, Jr.
*Assistant Examiner*—John W. Cabeca

[57] ABSTRACT

This invention provides a vector control method for controlling an induction motor that is used to drive an elevator based on secondary time constants, wherein the secondary time constants, which have been corrected for temperature, are determined in a short amount of time and the precision of the determination is improved, by passing a constant current of the same phase as during a similar operation to the excitation side of the induction motor while the elevator is mechanically stopped and then determining the secondary time constants.

4 Claims, 5 Drawing Sheets

VECTOR CONTROL METHOD OF INDUCTION MOTOR

This application is a continuation-in-part of application Ser. No. 07/636,855 filed on Jan. 2, 1991 now abandoned.

TECHNICAL FIELD

This invention relates to a vector control method whereby an induction motor is used to drive an elevator based on secondary time constants. In particular, it pertains to a vector control method with which the precision of the secondary time constant determination is improved.

BACKGROUND ART

Elevators may be driven by induction motors.

By means of vector control of induction motors, the primary current is divided into exciting current and torque current and the vector of the torque current and flux are crossed in order to obtain the same speed variation capability as with direct-current motors or better.

FIG. 3 is a diagram of one example of a vector control device. The numeral 1 in the figure is an induction motor and 2 is a speed detector. A speed computing section 3 is connected to the speed detector 2. Speed $W_n$ that is computed from the detected values by the speed computing section 3 and speed command N are balanced in a summer 3a and the difference into a torque computing section 4. A torque current command ($I_t$) is determined by a proportional integration (PI) computation. A primary current value ($I_1$) is determined from this torque current ($I_t$) and an exciting current set value ($I_o$) by primary current computing section 5 using $I_1 = \sqrt{I_t^2 + I_o^2}$. On the other hand, the phase angle $\phi$ of the torque current ($I_t$) and exciting current ($I_o$) is computed by phase computing section 6 using, $\phi = \tan^{-1}(I_t/I_o)$. Slip frequency computing section 7 determines the slip frequency ($W_s$) from torque current ($I_t$), exciting current ($I_o$), and secondary time constant $\tau_2$ of the motor as shown below; furthermore, time constant $\gamma_2 = L_2/R_2$ for secondary auto-inductance L2 and secondary resistance R2.

$$W_2 = I_t(I_o \cdot \tau_2)$$

This slip frequency ($W_s$) is added to the speed detected value ($W_n$) by adding device 8 to obtain the primary frequency ($W_o$).

The aforementioned primary current ($I_1$), phase angle $\phi$ and angular frequency ($W_o$) are input to a three-phase current computing section 9 to calculate primary currents $I_a$, $I_b$, and $I_c$ of motor 1. Using this current as the current command of inverter 10, primary current is fed to motor 1 by inverter 10. Computation by aforementioned three-phase current computing section 9 is performed by the following equations:

$$\theta = \int W_o dt$$

$$I_a = \sqrt{2} \ |I_1| \sin(\theta + \phi)$$

$$I_b = \sqrt{2} \ |I_1| \sin(\theta + 2/3\pi + \phi)$$

$$I_c = \sqrt{2} \ |I_1| \sin(\theta - 2/3\pi + \phi)$$

By means of this type of vector control device, secondary time constant $\tau_2$ for determining slip frequency $W_s$ is determined by constants L2 and R2 of the motor and changes in secondary resistance R2 with temperature of the motor are regarded as changes in secondary time constant $\tau_2$ and the primary current phase. Therefore, secondary time constant $\tau_2$ is corrected for temperature by computation from the primary voltage when a constant current is passing to the motor. FIG. 4 shows a graph of changes in primary voltage $V_1(t)$ when constant current $i_l$ is flowing. Primary voltage $V_1(t)$ is approximated by Therefore, secondary time constant $\tau_2$ is found with the following equation by determining primary voltages $V_1(t_1)$ and $V_1(t_1)$ at times $t_1$ and $t_2$.

$$\tau_2 = (t_2 - t_1)/\ln\left(\frac{v1(t1) - i1 r1}{v1(t2) - i1 r1}\right)$$

The effects of temperature can be eliminated by using this secondary time constant $\tau_2$ in computations of slip frequency.

In the aforementioned conventional method for correction of the secondary time constant, the steady-state values of $i_1$ and $r_1$ at primary voltage $V_1(t)$ are needed for determination of the secondary time constant and it takes a long time until primary voltage $V_1(t)$ reaches the steady-state level in these determinations. Consequently, there is a problem in that it takes a long time to prepare for operation of the motor and a control device is obtained whose use is off to a bad start.

DISCLOSURE OF INVENTION

This invention was devised in light of the problems previously described and its purpose is thus to present a vector control method for an induction motor with which the secondary time constant corrected for temperature is determined in a short amount of time and the precision of the determination is thereby improved.

According to the present invention, the precision of the determination of the secondary time constant $\tau_2$ is improved by passing a current which stabilizes the excitation state of the induction motor.

Fluctuations in phase can be avoided and the precision of the determination can be improved by passing a constant current of the same phase as when operation is initiated for a specific amount of time while the axle of the motor is mechanically stationary, either immediately after the elevator has stopped or immediately before it is started by the operation command. The theory behind induction motors is dislocation based on phase, but as long as the axle is mechanically stationary, errors will not occur, even when the phase is different from the stop phase.

Our solution for solving the aforementioned problems is a vector control method and apparatus for an induction motor whereby by means of vector control of an induction motor used to drive an elevator based on its secondary time constant, wherein the secondary time constant is determined by passing constant current of the same phase as during the following operation to the excitation side of the induction motor while the elevator is mechanically stopped. It is preferred that the controls be used immediately after the elevator has been stopped or immediately before it has been started as the timing at which the constant current flows.

These and other objects, features and advantages of the present invention will become more apparent in light of the following detailed description of a best mode embodiment thereof, as illustrated in the accompanying drawing.

| | |
|---|---|
| 1 | induction motor |
| 2 | speed detector |
| 3 | speed computing section |
| 4 | torque computing section |
| 5 | primary current computing section |
| 6 | phase computing section |
| 7 | frequency computing section |
| 8 | adding device |
| 9 | three-phase current computing section |
| 10 | inverter |
| 11 | control circuit |
| 12 | inverter body |
| 13 | rectifier |
| 14 | primary voltage detecting circuit |
| 15 | secondary time constant computing circuit |
| 16 | current detector |
| $\tau_2$ | secondary time constant |

BEST MODE FOR CARRYING OUT THE INVENTION

Figure 3:
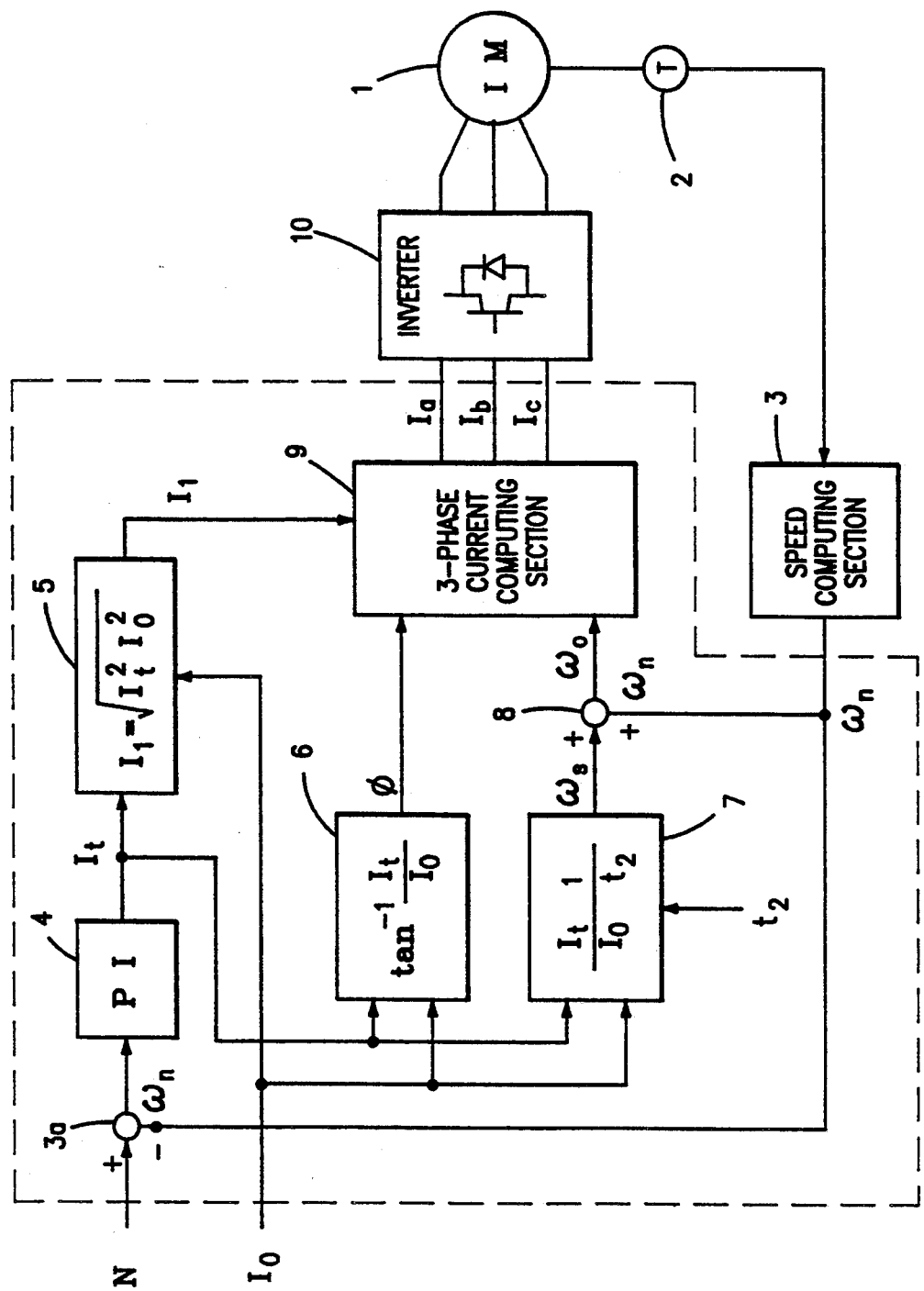
FIG. 3 is a diagram of a vector control device.
Figure 4:
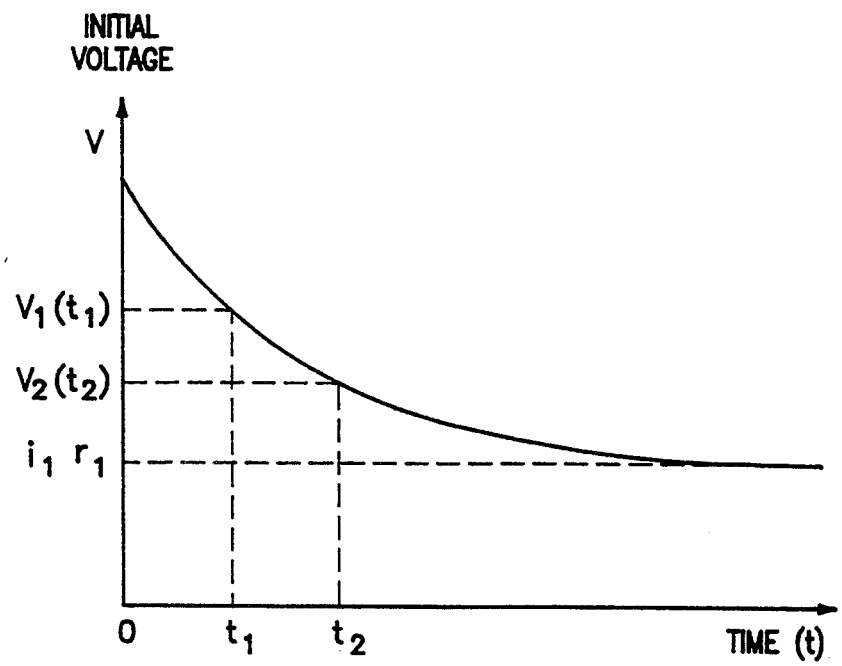
FIG. 4 gives the time properties of the primary voltage.
Figure 5:
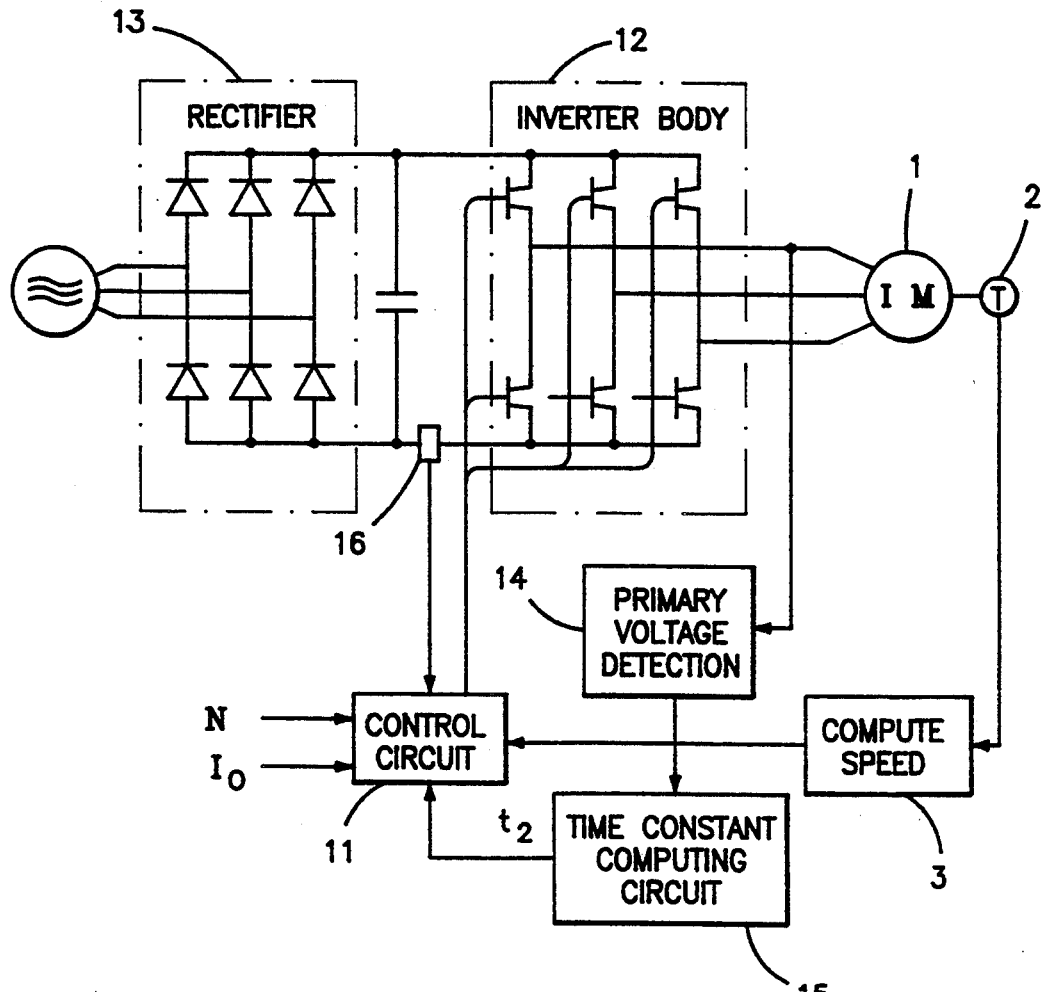
FIG. 5 shows an example of the present invention.
Figures 6, 7:
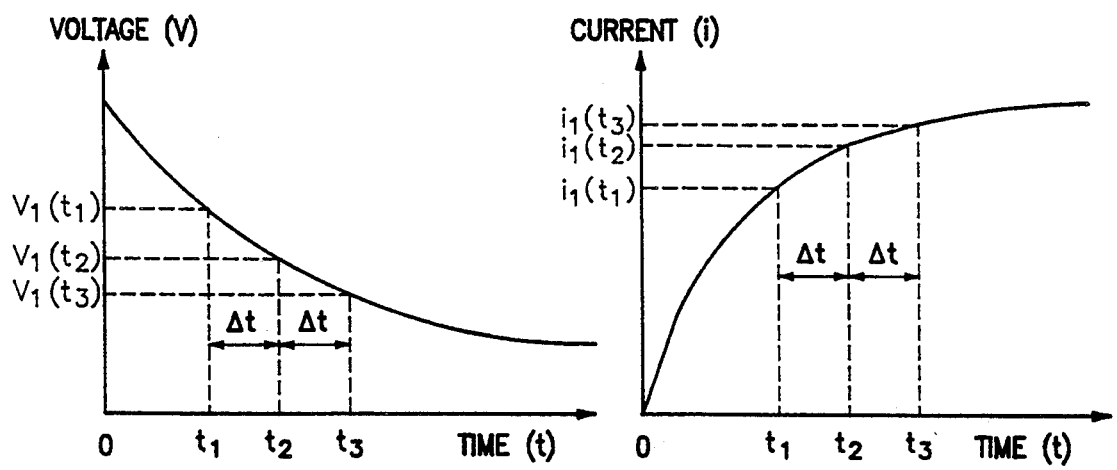
FIGS. 6 and 7 are diagrams showing the determination procedure.

Therefore, according to the present invention, a device shown in FIG. 5 has been presented for vector control with correction for temperature by determination of the secondary time constants in a short amount of time. In FIG. 5, control circuit 11 corresponds to computing sections 4 through 9 in aforementioned FIG. 3 and inverter body 12 and rectifier 13 correspond to inverter 10. Primary voltage detecting circuit 14, according to our invention, is connected to the primary side of induction motor 1 and secondary time constant computing circuit 15 is connected to this primary voltage detecting circuit 14. Primary voltages $V_1(t_1)$, $V_1(t_2)$, and $V_1(t_3)$ and determination interval $\Delta t$ ($= t_2 - t_1$, $t_3 - t_2$) from primary voltage detecting circuit 14 are input to secondary time constant computing circuit 15. Secondary time constant $\tau_2$ is calculated and output to control circuit 11. During computation of the secondary time constants, control circuit 11 feeds back the detected values of a current detector 16 and controls the on-off ratio of the switch transistors of inverter body 12 in order to apply constant voltage to motor 1. When this constant voltage is applied, primary voltage detecting circuit 14 detects primary voltages $V_1(t_1)$, $V_1(t_2)$ and $V_1(t_3)$ at times $t_1$, $t_2$, and $t_3$ of constant time interval $\Delta t$, as shown in FIG. 6, and secondary time constant $\tau_2$ is calculated by secondary time constant computing circuit 15 using the following equation:

$$\tau_2 = \Delta t / (ln \cdot V_1((t_1 - t_2)/(t_2 - t_3)))$$

Moreover, when the aforementioned constant voltage is applied, primary currents $i_1(t_1)$, $i_1(t_2)$ $i_1(t_3)$ at times $t_1$, $t_2$, and $t_3$ of constant time interval $\Delta t$ can be detected, as shown in FIG. 9, and secondary time constant $\tau_2$ can be calculated from the following equation:

$$\tau_2 = \Delta t / (ln\{i_1((t_2 - t_1)/(t_3 - t_2))\})$$

In either case, calculation of secondary time constant $\tau_2$ can be determined in a relatively short amount of time of $2\Delta t$ and it does not take a long time to determine steady-state values $i_1$ and $r_1$.

Figure 8:
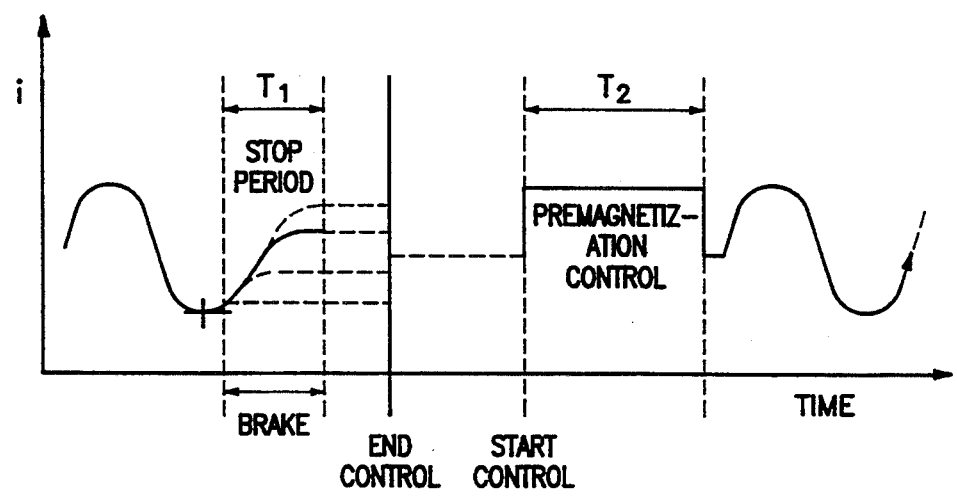
FIG. 8 is a waveform diagram of the current phase for elevator control, wherein the Drawing illustrates the following enumerated items.

Nevertheless, although the phase of the current when operation of the induction motor starts is usually constantly controlled, the phase when the induction motor used to drive elevators stops is not constant. That is, FIG. 8 is a waveform diagram showing an example of the current phase in elevator control and, as shown in this figure, when the elevator brakes are operated, the elevator stops at desired time $T_1$ and control "cutoff" occurs after a short amount of time, but there may be fluctuations in the stopping phase at this time, as shown by the broken curve in the figure. When controls are initiated during the subsequent operation, preexcitation at desired time $T_2$ occurs and then the elevator is operated once again.

Consequently, when constant current $i_1$ is passed to the induction motor when the following operation is started, the primary voltage $$V_1(t) = i_1(r_1 + r_2 e^{-t/\tau_2})$$

is determined, and secondary time constant $\tau_2$ is determined, fluctuations in phase produce fluctuations in the waveform of voltage $V_1(t)$ and there is no precision of detection of secondary time constant $\tau_2$.

Examples of the method of this invention will be described in detail while referring to the figures below.

By means of this invention, a current that stabilizes the excitation state is passed in order to improve the detection frequency of secondary time constant $\tau_2$ for repetitive starting operations of an induction motor for driving an elevator with the aforementioned type of control system.

Figure 1:
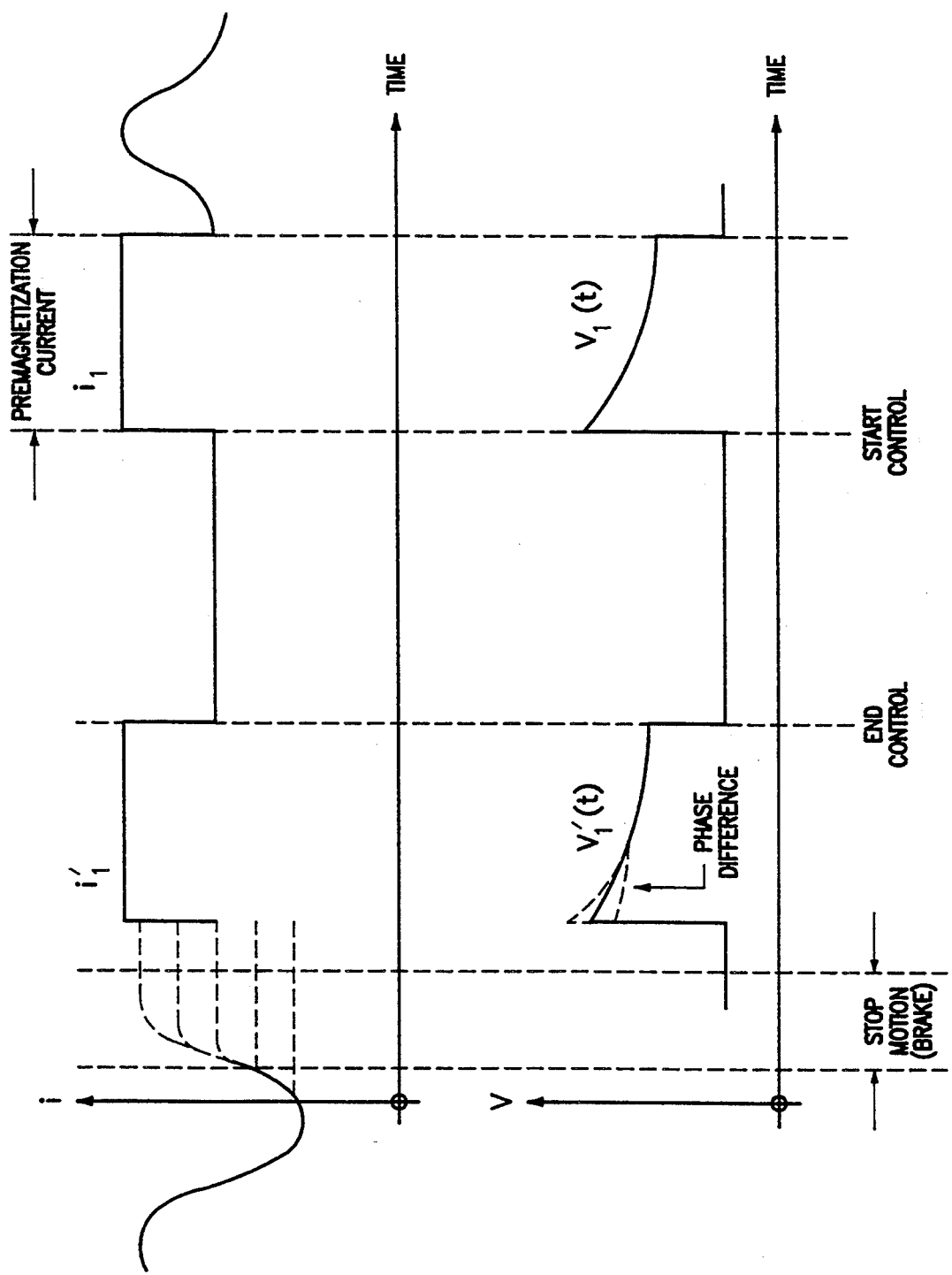
FIGS. 1A and 1B are waveform diagrams of an example of this invention.

FIG. 1 is a waveform diagram of an example of a method according to this invention. By means of this example, the control device for determination of secondary time constant $\tau_2$ when the following operation begins is operated as shown below after the elevator has stopped and before control "cut" occurs (e.g., "end control" of FIGS. 1 and 8) occurs.

(1) The axle of the motor becomes stationary by operation of mechanical brakes when the elevator is stopped.

(2) Constant current $i_1$ of the same phase as when operation is started is passed for a selected amount of time. This time as shown after motion has stopped, in FIG. 1(a) may be determined from the time constant of the motor. Even if the phase of the current $i_1'$ varies from the stop phase, the axle is mechanically stationary, and therefore, there are no errors. However, fluctuations in voltage $V_1(t)$ at this time will occur with differences in phase, as shown by dashed lines in FIG. 1(b).

(3) The next operating cycle begins after a period of time has passed. Voltage $V_1(t)$ at constant current $i_1$ is determined and secondary time constant $\tau_2$ is computed, as previously described in connection with FIGS. 4, 6, 7 and 8. The specific time may be as long as several seconds and should not pose problems in terms of the control sequence, such as the opening/closing sequence of elevator doors, etc.

(4) The effects of temperature are thereafter eliminated using the calculated secondary time constant $\tau_2$ in computations of vector control.

Figure 2:
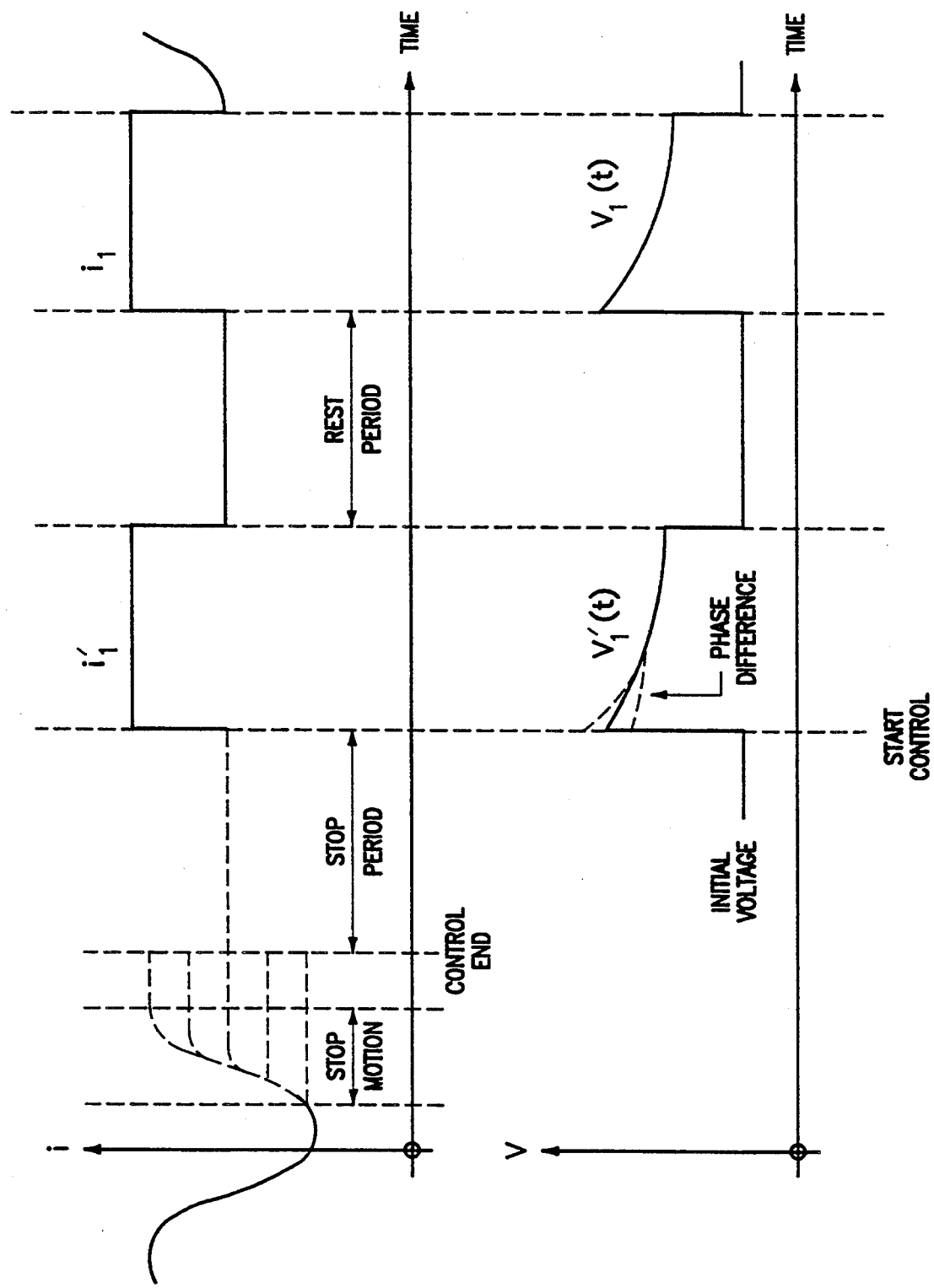
FIGS. 2A and 2B are waveform diagrams of another example of this invention.

FIG. 2 shows the waveform diagram of another example of this invention. By means of this example, the control device is operated immediately before the elevator is started in order to prevent errors in detection of secondary time constant $\tau_2$ that are produced due to differences in current phase when the previous operation stopped.

(1) Elevator control-initiating signals are applied.

(2) Constant current $i_1'$ of the same phase as when operation is started is passed for a selected amount of time with the brakes being mechanically applied. This time may be determined from the motor time constant, as in the other example. Furthermore, there may be variations in voltage $V_1'(t)$ at this time due to the phase difference when the elevator is stopped.

(3) The desired current cut off time is determined from the time constant of the elevator.

The next operation cycle begins and $\tau_2$ is determined, as before.

As previously explained, by means of this invention, a vector control method for an induction motor is presented with which the secondary time constant that has been corrected for temperature is determined in a short amount of time and the precision of determination is improved.

Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

We claim:

1. A vector control method for an induction motor for driving an elevator based on a secondary time constant, comprising the step of determining the secondary time constant by passing a constant current, of the same phase as during a passing of current to the excitation side of the induction motor, with the elevator mechanically stopped.

2. The vector control method for an induction motor in claim 1 wherein said step of determining is immediately after the elevator has stopped.

3. The vector control method for an induction motor in claim 1 wherein said step of determining is immediately before the elevator is operated.

4. A vector control apparatus for an induction motor for driving an elevator comprising vector control means for controlling the induction motor based on secondary time constants, and means for determining secondary time constants by passing a constant current, of the same phase as during a passing of current to the excitation side of the induction motor, with the elevator mechanically stopped.

* * * * *